United States Patent
Miklós et al.

(10) Patent No.: US 12,494,942 B2
(45) Date of Patent: Dec. 9, 2025

(54) PACKET DETECTION RULES DERIVED FROM ETHERNET FORWARDING INFORMATION

(71) Applicant: Telefonaktiebolaget LM Ericsson (publ), Stockholm (SE)

(72) Inventors: György Miklós, Pilisborosjenö (HU); Balázs Varga, Budapest (HU); János Farkas, Kecskemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 17/926,661

(22) PCT Filed: May 21, 2021

(86) PCT No.: PCT/IB2021/054454
§ 371 (c)(1),
(2) Date: Nov. 21, 2022

(87) PCT Pub. No.: WO2021/234671
PCT Pub. Date: Nov. 25, 2021

(65) Prior Publication Data
US 2023/0239174 A1    Jul. 27, 2023

Related U.S. Application Data

(60) Provisional application No. 63/028,612, filed on May 22, 2020.

(51) Int. Cl.
*H04L 12/46* (2006.01)
*H04L 45/00* (2022.01)

(52) U.S. Cl.
CPC .......... *H04L 12/4625* (2013.01); *H04L 45/66* (2013.01)

(58) Field of Classification Search
None
See application file for complete search history.

(56) References Cited

U.S. PATENT DOCUMENTS

2021/0219357 A1* 7/2021 Talebi Fard ............ H04L 67/14

OTHER PUBLICATIONS

Ericsson, "S2-2003149R01: Enhancements/clarifications on Ethernet Switching," 3GPP TSG-WG SA2 Meeting #138E, Apr. 20-24, 2020, 6 pages.

(Continued)

*Primary Examiner* — Kouroush Mohebbi
(74) *Attorney, Agent, or Firm* — Sonoda & Kobayashi Intellectual Property Law; Sarvajit S. Patil

(57) ABSTRACT

Systems and methods are disclosed herein that relate to obtaining and using Packet Detection Rules (PDRs) in a cellular communications system operating as virtual Ethernet bridge based on Ethernet forwarding information. In one embodiment, a method performed by a User Plane Function (UPF) for enabling a cellular communications system to operate as a virtual Ethernet bridge comprises obtaining a PDR for a Protocol Data Unit (PDU) session in a downlink direction in the cellular communications system. The PDU session is associated with an egress Ethernet port of the virtual Ethernet bridge for the downlink direction, the PDR maps Ethernet packets received at the UPF on an ingress Ethernet port(s) of the virtual Ethernet bridge to the PDU session associated with the egress Ethernet port of the virtual Ethernet bridge, and the PDR is derived from an Ethernet packet forwarding rule of the virtual Ethernet bridge.

16 Claims, 10 Drawing Sheets

(56) References Cited

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.
International Search Report and Written Opinion for International Patent Application No. PCT/IB2021/054454, mailed Sep. 3, 2021, 20 pages.

* cited by examiner

PACKET DETECTION RULES DERIVED FROM ETHERNET FORWARDING INFORMATION

RELATED APPLICATIONS

This application is a 35 U.S.C. § 371 national phase filing of International Application No. PCT/IB2021/054454, filed May 21, 2021, which claims the benefit of provisional patent application Ser. No. 63/028,612, filed May 22, 2020, the disclosures of which are hereby incorporated herein by reference in their entireties.

TECHNICAL FIELD

The present disclosure relates to a cellular communications system that operates as a virtual Ethernet bridge and, more specifically, to configuration of packet detection rules.

BACKGROUND

In the case of Ethernet traffic over Third Generation Partnership Project (3GPP) networks, the User Plane Function (UPF) needs to determine which Protocol Data Unit (PDU) Session to use for a given Ethernet frame in the downlink. The UPF may be acting as an Ethernet bridge, and the rules for forwarding may change dynamically.

There are several existing mechanisms available for determining the PDU Session in the downlink. As described in 3GPP Technical Specification (TS) 23.501 (see, e.g., V16.4.0), section 5.6.10.2, we have the following options:
  Configurations with a 1-1 relationship between a PDU Session and a N6 interface possibly corresponding to a dedicated tunnel established over N6. In this case the UPF acting as PSA transparently forwards Ethernet frames between the PDU Session and its corresponding N6 interface, and it does not need to be aware of MAC addresses used by the UE in order to route down-link traffic.
  Configurations, where more than one PDU Session to the same DNN (e.g. for more than one UE) corresponds to the same N6 interface. In this case the UPF acting as PSA needs to be aware of MAC addresses used by the UE in the PDU Session in order to map down-link Ethernet frames received over N6 to the appropriate PDU Session. Forwarding behaviour of the UPF acting as PSA is managed by SMF as specified in clause 5.8.2.5.

In clause 5.8.2.5 of 3GPP TS 23.501, it is detailed how to route the traffic based on detected Medium Access Control (MAC) addresses.

Additionally, as described for Fifth Generation (5G) Virtual Network (VN) group communication in 3GPP TS 23.501 section 5.8.2.13.0, the Session Management Function (SMF) may centrally set the filtering rules that determine which PDU Session to forward packets to in the downlink:
  The SMF may configure the UPF(s) to apply different traffic forwarding methods to route traffic between PDU Sessions for a single 5G VN group. For example, depending on the destination address, some packet flows may be forwarded locally, while other packet flows are forwarded via N19 and other packet flows are forwarded to N6.

In the context of Time Sensitive Networking (TSN) support in 3GPP networks, it is also possible to use static Ethernet forwarding rules, but only in the uplink direction to determine which port on the N6 interface to use. As defined in 3GPP TS 23.501 section 5.28.3.1, static filtering entries may be provided in the UPF. However, these static filtering entries are only applicable currently to uplink traffic and are used to determine which outgoing Network side TSN Translator (NW-TT) port to use, i.e., these filtering entries are not used for downlink traffic.

SUMMARY

Systems and methods are disclosed herein that relate to obtaining and using Packet Detection Rules (PDRs) in a cellular communications system operating as virtual Ethernet bridge based on Ethernet forwarding information. Embodiments of a method performed by a User Plane Function (UPF) for a core network of a cellular communications system for enabling the cellular communications system to operate as a virtual Ethernet bridge are disclosed. In one embodiment, the method performed by the UPF comprises obtaining a PDR for a Protocol Data Unit (PDU) session in a downlink direction in the cellular communications system. The PDU session is associated with an egress Ethernet port of a virtual Ethernet bridge provided by the cellular communications system for the downlink direction, the PDR maps Ethernet packets received at the UPF on an ingress Ethernet port(s) of the virtual Ethernet bridge provided by the cellular communications system to the PDU session associated with the egress Ethernet port of the virtual Ethernet bridge provided by the cellular communications system in accordance with an Ethernet packet forwarding rule of the virtual Ethernet bridge, and the PDR is derived from the Ethernet packet forwarding rule. In this manner, the existing framework for downlink forwarding in the UPF is maintained, while externally provided forwarding rules are configured into the system.

In one embodiment, the method further comprises applying the PDR at the UPF.

In one embodiment, obtaining the PDR comprises receiving the PDR from another network entity. In one embodiment, the another network entity is a Session Management Function (SMF). In one embodiment, the method further comprises receiving the Ethernet packet forwarding rule and configuring the Ethernet packet forwarding rule at the UPF.

In one embodiment, obtaining the PDR comprises receiving one or more Ethernet packet forwarding rules comprising the Ethernet packet forwarding rule, determining that the Ethernet packet forwarding rule is a rule for which Ethernet packets will be forwarded to a PDU session in the downlink direction, reporting the Ethernet packet forwarding rule to another network entity, and receiving the PDR from the another network entity responsive to reporting the Ethernet packet forwarding rule to the another network entity. In one embodiment, the another network entity is a SMF.

In one embodiment, obtaining the PDR comprises receiving one or more Ethernet packet forwarding rules comprising the Ethernet packet forwarding rule, determining that the Ethernet packet forwarding rule is a rule for which Ethernet packets will be forwarded to a PDU session in the downlink direction, deriving the PDR based on the Ethernet packet forwarding rule, and configuring the PDR at the UPF.

Corresponding embodiments of a UPF are also disclosed. In one embodiment, a UPF for a core network of a cellular communications system for enabling the cellular communications system to operate as a virtual Ethernet bridge is adapted to obtain a PDR for a PDU session in a downlink direction in the cellular communications system, wherein the PDU session is associated with an egress Ethernet port of a virtual Ethernet bridge provided by the cellular communications system for the downlink direction, the PDR maps Ethernet packets received at the UPF on an ingress Ethernet port(s) of the virtual Ethernet bridge provided by the cellular communications system to the PDU session associated with the egress Ethernet port of the virtual Ethernet bridge provided by the cellular communications system in accordance with an Ethernet packet forwarding rule of the virtual Ethernet bridge, and the PDR is derived from the Ethernet packet forwarding rule.

In one embodiment, a network node for implementing a UPF for a core network of a cellular communications system for enabling the cellular communications system to operate as a virtual Ethernet bridge comprises processing circuitry configured to cause the network node to obtain a PDR for a PDU session in a downlink direction in the cellular communications system, wherein the PDU session is associated with an egress Ethernet port of a virtual Ethernet bridge provided by the cellular communications system for the downlink direction, the PDR maps Ethernet packets received at the UPF on an ingress Ethernet port(s) of the virtual Ethernet bridge provided by the cellular communications system to the PDU session associated with the egress Ethernet port of the virtual Ethernet bridge provided by the cellular communications system in accordance with an Ethernet packet forwarding rule of the virtual Ethernet bridge, and the PDR is derived from the Ethernet packet forwarding rule.

Embodiments of a method performed by network function (NF) for a core network of a cellular communications system for enabling the cellular communications system to operate as a virtual Ethernet bridge comprises receiving one or more Ethernet packet forwarding rules for a virtual Ethernet bridge provided by the cellular communications system, identifying an Ethernet packet forwarding rule from among the one or more Ethernet packet forwarding rules that will result in forwarding of Ethernet packets received at a UPF of the cellular communications system on an ingress Ethernet port of the virtual Ethernet bridge to a PDU session of the cellular communications system for a downlink direction, the PDU session being associated with an egress Ethernet port of the virtual Ethernet bridge provided by the cellular communications system. The method further comprises deriving a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and providing the PDR to the UPF.

In one embodiment, the NF is a SMF.

Corresponding embodiments of a NF are also disclosed. In one embodiment, a NF for a core network of a cellular communications system for enabling the cellular communications system to operate as a virtual Ethernet bridge is adapted to receive one or more Ethernet packet forwarding rules for a virtual Ethernet bridge provided by the cellular communications system and identify an Ethernet packet forwarding rule from among the one or more Ethernet packet forwarding rules that will result in forwarding of Ethernet packets received at a UPF of the cellular communications system on an ingress Ethernet port of the virtual Ethernet bridge to a PDU session of the cellular communications system for a downlink direction, the PDU session being associated with an egress Ethernet port of the virtual Ethernet bridge provided by the cellular communications system. The NF is further adapted to derive a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and provide the PDR to the UPF.

In one embodiment, a network node for implementing a NF for a core network of a cellular communications system for enabling the cellular communications system to operate as a virtual Ethernet bridge comprises processing circuitry configured to cause the network node to receive one or more Ethernet packet forwarding rules for a virtual Ethernet bridge provided by the cellular communications system and identify an Ethernet packet forwarding rule from among the one or more Ethernet packet forwarding rules that will result in forwarding of Ethernet packets received at a UPF of the cellular communications system on an ingress Ethernet port of the virtual Ethernet bridge to a PDU session of the cellular communications system for a downlink direction, the PDU session being associated with an egress Ethernet port of the virtual Ethernet bridge provided by the cellular communications system. The NF is further adapted to derive a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and provide the PDR to the UPF.

Embodiments of a method performed by NF for a core network of a cellular communications system for enabling the cellular communications system to operate as a virtual Ethernet bridge are also disclosed. In one embodiment, the method comprises receiving one or more Ethernet packet forwarding rules for a virtual Ethernet bridge provided by the cellular communications system, providing the one or more Ethernet packet forwarding rules to a UPF, and receiving, from the UPF, a notification of an Ethernet packet forwarding rule from among the one or more Ethernet packet forwarding rules that will result in forwarding of Ethernet packets received at the UPF on an ingress Ethernet port of the virtual Ethernet bridge provided by the cellular communications system to a PDU session of the cellular communications system for a downlink direction, the PDU session being associated with an egress Ethernet port of the virtual Ethernet bridge provided by the cellular communications system. The method further comprises deriving a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and providing the PDR to the UPF.

In one embodiment, the NF is a SMF.

In one embodiment, a NF for a core network of a cellular communications system for enabling the cellular communications system to operate as a virtual Ethernet bridge is adapted to receive one or more Ethernet packet forwarding rules for a virtual Ethernet bridge provided by the cellular communications system, provide the one or more Ethernet packet forwarding rules to a UPF, and receive, from the UPF, a notification of an Ethernet packet forwarding rule from among the one or more Ethernet packet forwarding rules that will result in forwarding of Ethernet packets received at the UPF on an ingress Ethernet port of the virtual Ethernet bridge provided by the cellular communications system to a PDU session of the cellular communications system for a downlink direction, the PDU session being associated with an egress Ethernet port of the virtual Ethernet bridge provided by the cellular communications system. The NF is further adapted to derive a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and provide the PDR to the UPF.

In one embodiment, a network node for implementing a NF for a core network of a cellular communications system for enabling the cellular communications system to operate as a virtual Ethernet bridge comprises processing circuitry configured to cause the network node to receive one or more Ethernet packet forwarding rules for a virtual Ethernet bridge provided by the cellular communications system, provide the one or more Ethernet packet forwarding rules to a UPF, and receive, from the UPF, a notification of an Ethernet packet forwarding rule from among the one or more Ethernet packet forwarding rules that will result in forwarding of Ethernet packets received at the UPF on an ingress Ethernet port of the virtual Ethernet bridge provided by the cellular communications system to a PDU session of the cellular communications system for a downlink direction, the PDU session being associated with an egress Ethernet port of the virtual Ethernet bridge provided by the cellular communications system. The NF is further adapted to derive a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and provide the PDR to the UPF.

In one embodiment, a method performed by NF for a core network of a cellular communications system for enabling the cellular communications system to operate as a virtual Ethernet bridge comprises receiving, from another network entity, a notification of an Ethernet packet forwarding rule that will result in forwarding of Ethernet packets received at the UPF on an ingress Ethernet port of the virtual Ethernet bridge provided by the cellular communications system to a PDU session of the cellular communications system for a downlink direction, the PDU session being associated with an egress Ethernet port of the virtual Ethernet bridge provided by the cellular communications system. The method further comprises deriving a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and providing the PDR to the UPF.

In one embodiment, the NF is a SMF.

Corresponding embodiments of a NF are also disclosed. In one embodiment, a NF for a core network of a cellular communications system for enabling the cellular communications system to operate as a virtual Ethernet bridge is adapted to receive, from another network entity, a notification of an Ethernet packet forwarding rule that will result in forwarding of Ethernet packets received at the UPF on an ingress Ethernet port of the virtual Ethernet bridge provided by the cellular communications system to a PDU session of the cellular communications system for a downlink direction, the PDU session being associated with an egress Ethernet port of the virtual Ethernet bridge provided by the cellular communications system. The NF is further adapted to derive a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and provide the PDR to the UPF.

In one embodiment, a network node for implementing a NF for a core network of a cellular communications system for enabling the cellular communications system to operate as a virtual Ethernet bridge comprises processing circuitry configured to cause the network node to receive, from another network entity, a notification of an Ethernet packet forwarding rule that will result in forwarding of Ethernet packets received at the UPF on an ingress Ethernet port of the virtual Ethernet bridge provided by the cellular communications system to a PDU session of the cellular communications system for a downlink direction, the PDU session being associated with an egress Ethernet port of the virtual Ethernet bridge provided by the cellular communications system. The NF is further adapted to derive a PDR for the PDU session that maps Ethernet packets received at a UPF of the cellular communications system on the ingress Ethernet port of the virtual Ethernet bridge to the PDU session associated with the egress Ethernet port in accordance with the Ethernet packet forwarding rule and provide the PDR to the UPF.

In another embodiment, a method performed by a UPF for a core network of a cellular communications system for enabling the cellular communications system to operate as a virtual Internet Protocol (IP) router comprises obtaining a PDR for a PDU session in a downlink direction in the cellular communications system, wherein the PDU session is associated with an egress port of a virtual IP router provided by the cellular communications system for the downlink direction, the PDR maps IP packets received at the UPF on an ingress port(s) of the virtual IP router provided by the cellular communications system to the PDU session associated with the egress port of the virtual IP router provided by the cellular communications system in accordance with an IP packet forwarding rule of the virtual IP router, and the PDR is derived from the IP packet forwarding rule.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
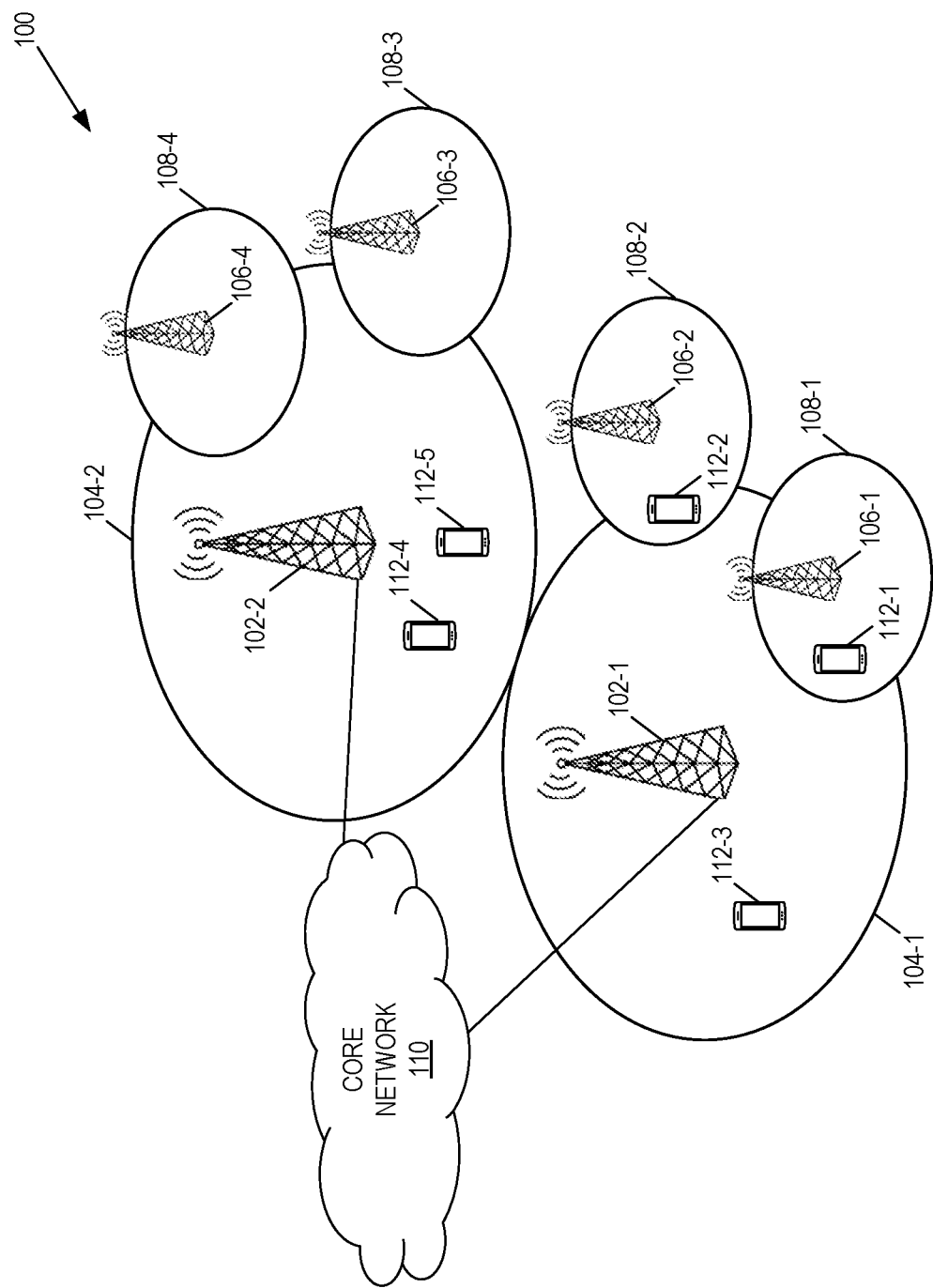
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The existing solution allows the 3GPP system to set forwarding rules based information that is available inside the system, such as based on Medium Access Control (MAC) learning, or based on pre-configuration in the SMF. There could however be situations where the forwarding rules may need to be updated dynamically based on externally provided information.

As an example, in an Ethernet network, there may be a central controller such as a Centralized Network Controller (CNC) which sets the forwarding rules (at least partly) in the bridges of an Ethernet network. In such a deployment, it can be necessary to allow the 3GPP network—which may act as one or more virtual bridges in the Ethernet network—to configure forwarding rules based on the forwarding rules provided by a CNC.

Such functionality is already available in the 3GPP system for uplink traffic in the TSN case, but as noted above, the existing static filtering entries that may be provided externally by the CNC and configured into the UPF are only applicable in the uplink. Hence, they do not play a role currently in determining the PDU Session to use in the downlink direction.

When Ethernet bridging functionality is implemented inside the UPF, then each PDU Session corresponds to a port of the logical bridge. Hence, the PDU Sessions are bound to a logical port of the bridge. This binding may be implemented in a number of ways. For example, an identifier is assigned to each logical port of the bridge, and downlink packets are tagged with that identifier inside the UPF, based on which the packets are mapped to the given PDU Session. The UPF implementation may manage this mapping internally; hence, it is not exposed to standardized interfaces. This binding limits the amount of traffic that is offered to a PDU Session; the SMF may configure Packet Detection Rules (PDRs) with match all filtering for each PDU session (or filtering rules for e.g., Quality of Service (QoS) as required) since the bridging functionality will ensure that only the traffic destined to the given PDU Session are to arrive to the Packet Detection Rules (PDRs) for that PDU session.

However, in certain implementations, it may not be possible or efficient to use such binding between a PDU Session and the Ethernet bridge port. That is because existing implementations are based on using PDRs for the PDU Sessions which are set by the SMF over the N4 interface. These PDRs include filters on the packet headers which determine which PDU Session to use for a given packet. Since this is how existing UPF implementations work, in certain deployments, it can be efficient and useful to re-use these rules for determining which PDU Session to forward a packet on.

Certain aspects of the present disclosure and their embodiments may provide solutions to the aforementioned or other challenges. In one embodiment, the SMF gets information about the forwarding rules that apply to PDU Sessions in the downlink. The SMF converts these forwarding rules to PDRs and uses the N4 sessions to the affected PDU Sessions to install/update the PDRs in the UPF.

In one embodiment, the bridging functionality within the UPF has Ethernet forwarding rules, which may originate from a central controller (e.g., a CNC of an Ethernet network such as, e.g., a TSN network). Based on these forwarding rules, the PDRs for the individual PDU Sessions are set. Different embodiments are disclosed herein. The derivation of the PDRs can be performed e.g., in the SMF or within the UPF.

Certain embodiments may provide one or more of the following technical advantage(s). Embodiments of the solution disclosed herein retain the existing framework for downlink forwarding in the UPF, while externally provided forwarding rules are configured into the system.

FIG. 1 illustrates one example of a cellular communications system 100 in which embodiments of the present disclosure may be implemented. In the embodiments described herein, the cellular communications system 100 is a 5G System (5GS) including a Next Generation RAN (NG-RAN) and a 5G Core (5GC). In this example, the RAN includes base stations 102-1 and 102-2, which in the 5GS include NR base stations (gNBs) and optionally next generation eNBs (ng-eNBs) (i.e., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs and as such they are sometimes referred to herein as UEs 112, but the present disclosure is not limited thereto.

Figure 2:
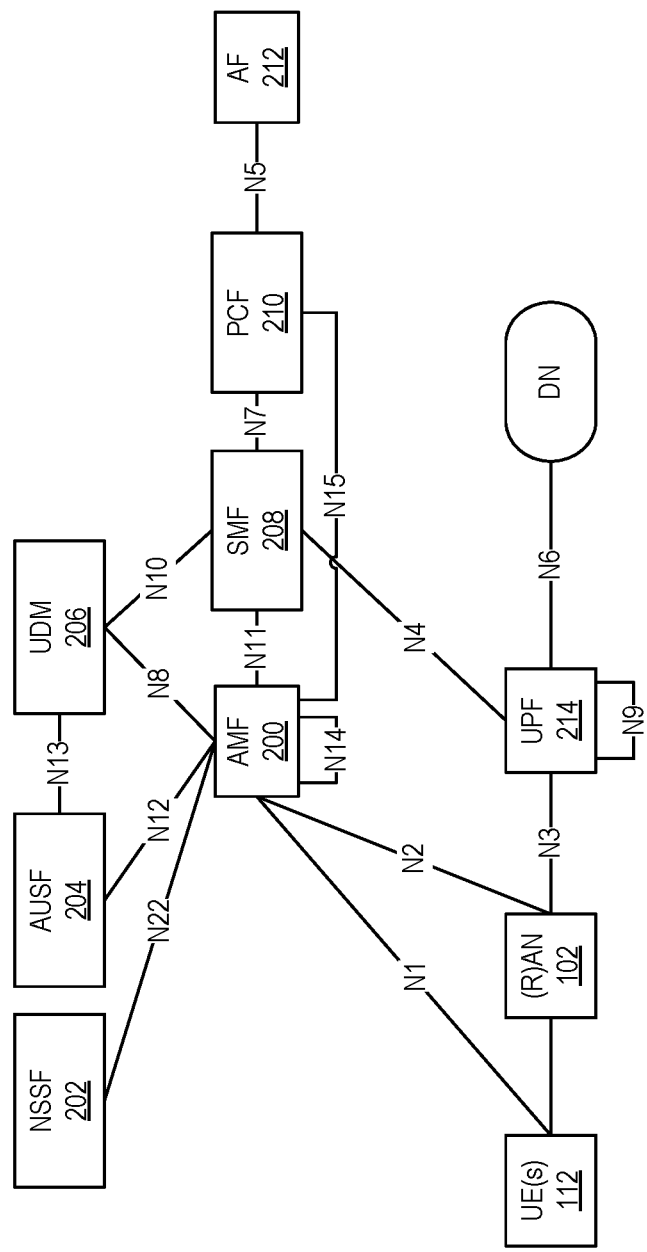
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
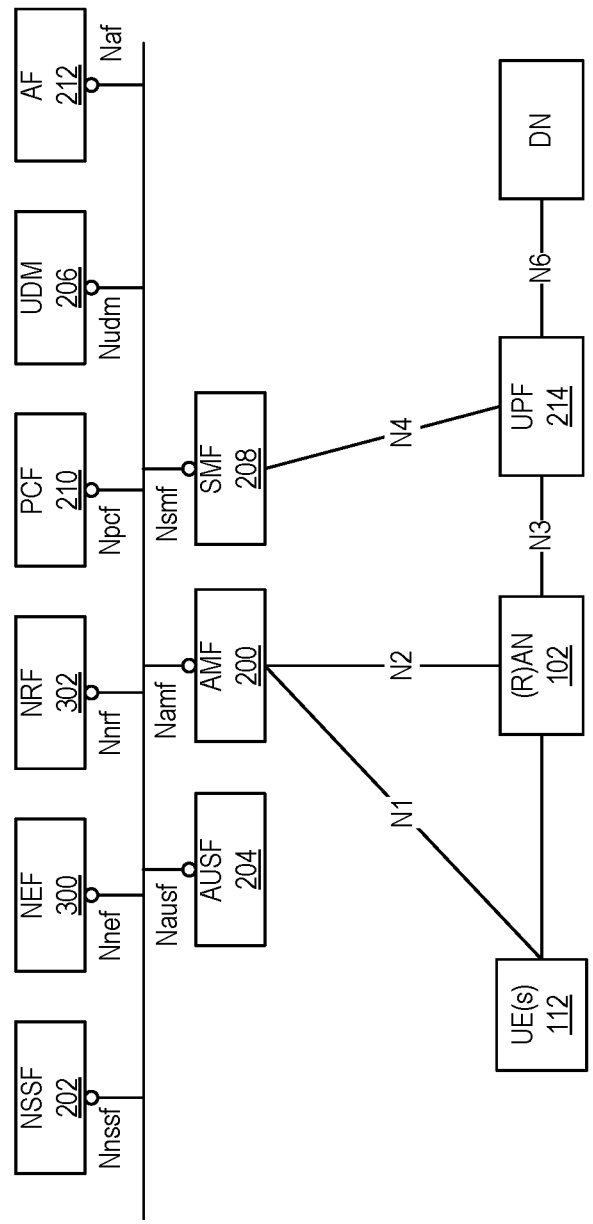
FIG. 3 illustrates a 5G network architecture using service-based interfaces between the NFs in the control plane (CP), instead of the point-to-point reference points/interfaces used in the 5G network architecture of FIG. 2.

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
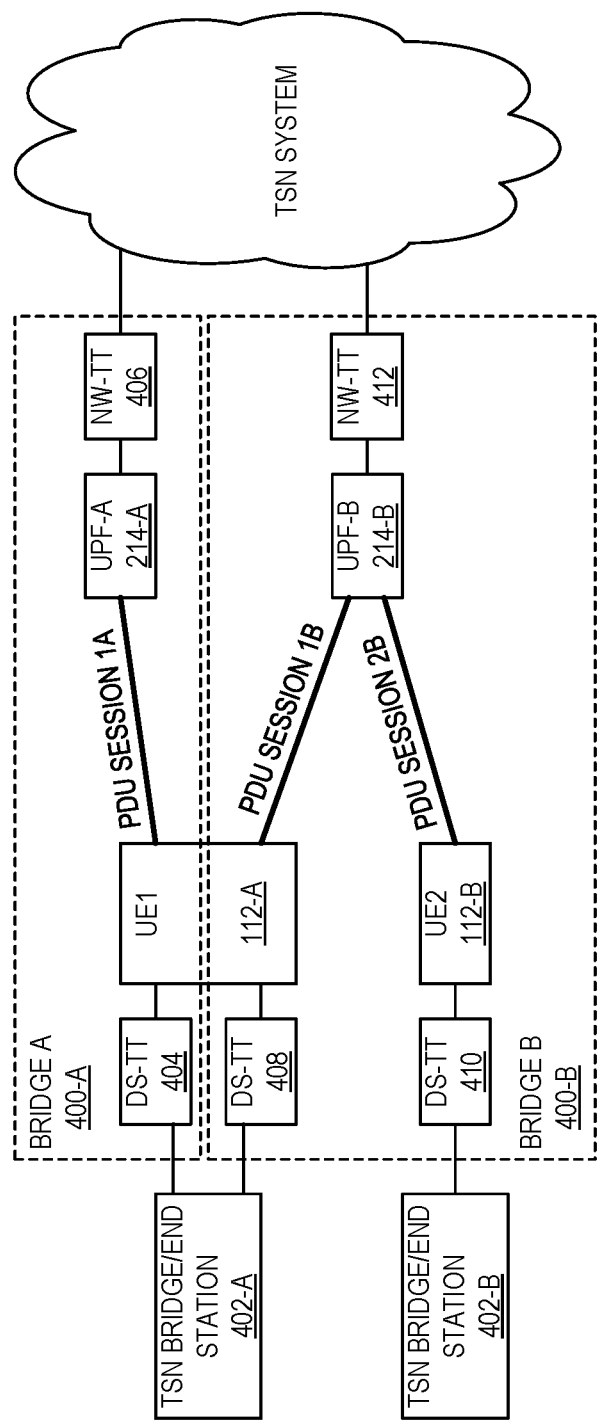
FIG. 4 is an example illustration of the 5G system (5GS) implementing a number of virtual Ethernet bridges in accordance with embodiments of the present disclosure.

FIG. 4 is an example illustration of the 5GS implementing a number of virtual Ethernet bridges in accordance with embodiments of the present disclosure. In this example, the virtual Ethernet bridges virtual TSN bridges; however, the embodiments described herein are not limited to TSN. In this example, as illustrated, the 5GS implements a first virtual TSN bridge 400-A (denoted in FIG. 4 as "Bridge A") including a first UPF 214-A (denoted in FIG. 4 as "UPF-A"), and a second virtual TSN bridge 400-B (denoted in FIG. 4 as "Bridge B") including a second UPF 214-B (denoted in FIG. 4 as "UPF-B"). As illustrated, a first port of a first TSN bridge or TSN end station 402-A is connected to a DS-TT 404 associated with a first UE 112-A (denoted in FIG. 4 as "UE1"). The DS-side TT 404 together with the first UE 112-A, the first UPF 614-A, and a NW-TT 406 implement the first virtual TSN bridge 400-A. All PDU sessions for the particular TSN system shown (including a first PDU session from the first UE 112-A to the first UPF 614-A, which is denoted "PDU Session 1A") which connect to the first UPF 614-A are grouped into the first virtual TSN bridge 400-A. As illustrated, in this example, a second port of the first TSN bridge or end station 402-A is connected to a DS-TT 408 associated with the first UE 112-A. In addition, a port of a second TSN bridge or end station 402-B is connected to a DS-TT 410 associated with a second UE 112-B (denoted in FIG. 4 as "UE2"). The DS-side TTs 408 and 410 together with the UEs 112-A and 112-B, the second UPF 214-B, and a NW-TT 412 implement the second virtual TSN bridge 400-B. All PDU sessions for the particular TSN system shown (including a second PDU session from the first UE 112-A to the first UPF 214-A, which is denoted "PDU Session 1B", and a PDU session from the second UE 112-B to the second UPF 214-B, which is denoted "PDU Session 2B") which connect to the second UPF 214-B are grouped into the second virtual TSN bridge 400-B.

In one embodiment of the solution disclosed herein, the SMF 208 obtains information about one or more forwarding rules that apply to PDU Sessions in the downlink in the 5GS. The SMF 208 converts these forwarding rules to PDRs and uses the N4 sessions to the affected PDU Sessions to install or update the PDRs in the UPF 214.

In one embodiment, the bridging functionality within the UPF 214 has Ethernet forwarding rules, which may originate from a central controller (e.g., a CNC of an Ethernet network such as, e.g., a TSN network). Based on these forwarding rules, the PDRs for the individual PDU Sessions are set. Different embodiments are disclosed herein. The derivation of the PDRs can be performed e.g., in the SMF 208 or within the UPF 214.

Figure 5:
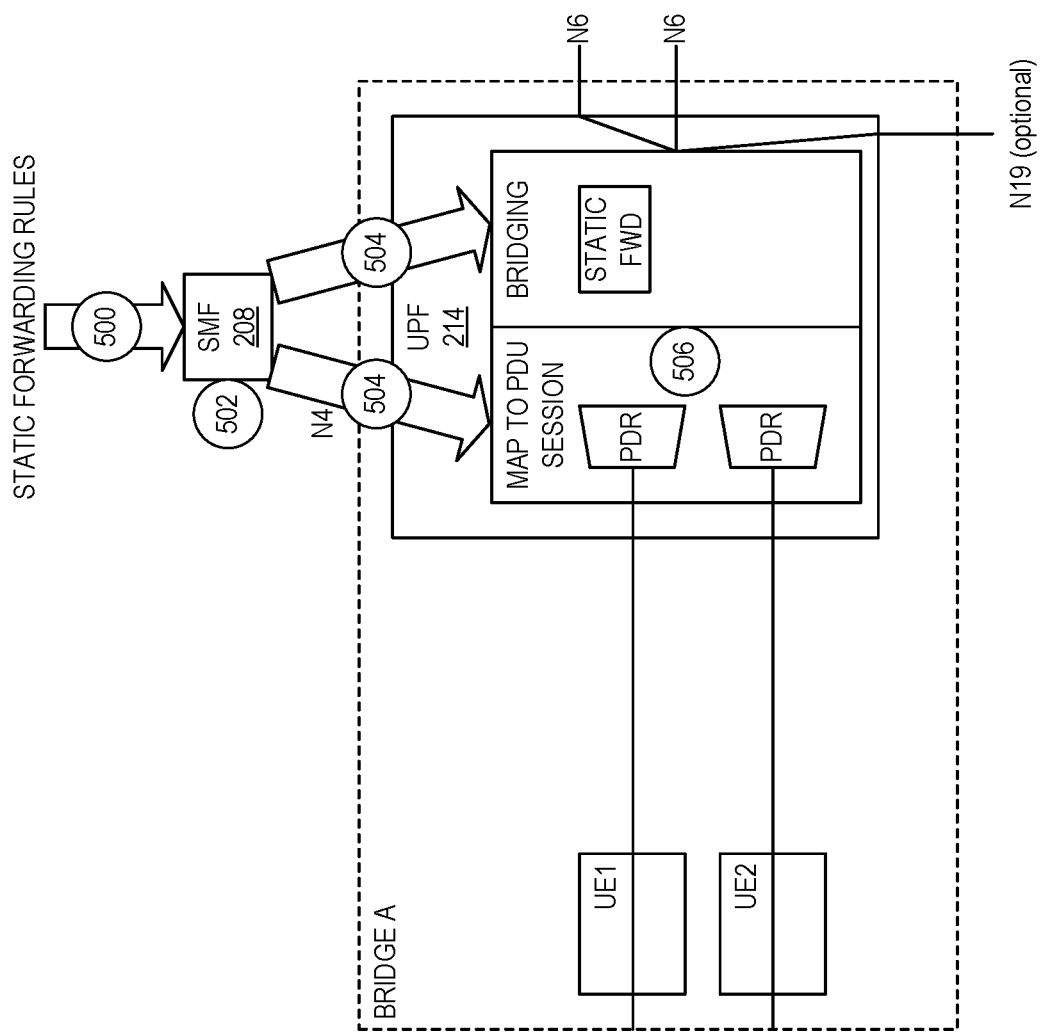
FIGS. 5, 6, 7, and 8 illustrate processes in which Packet Detection Rules (PDRs) are derived and configured in the 5GS operating as a virtual Ethernet bridge based on Ethernet forwarding rules, according to various embodiments of the present disclosure.

FIG. 5 illustrates a process in accordance with one embodiment of the solution described herein. The steps of this process are as follows.

Step 500: The SMF 208 receives static forwarding rules. These static forwarding rules are Ethernet packet forwarding rules for the virtual Ethernet bridge provided by the 5GS (i.e., forwarding rules that define how Ethernet packets are to be forwarded between ports of the virtual Ethernet bridge). Such rules may be provided e.g., by a CNC acting as a central controller in an Ethernet network. E.g., in case of a TSN network, the static forwarding rules may be provided from the CNC to a TSN AF, which then sends those rules in a Bridge Management Information Container to the SMF 208 via the PCF 210.

Step 502: The SMF 208 parses the forwarding rules to check whether there are entries (i.e., forwarding rules) which map traffic to the logical ports of the UPF 214 that correspond to PDU Sessions for the downlink. This can be based on e.g., port numbers that the SMF 208 is aware of for each PDU Session. Instead of the port numbers, there may be other identifiers used for the ports/PDU Sessions. Note that, in the 3GPP architecture, the virtual Ethernet bridge also includes the PDU Session and the UE 112 represented by a DS-TT (e.g., DS-TT 404). Thus, it is important to distinguish between the ports of the virtual Ethernet bridge (i.e., the DS-TT ports and the NW-TT ports of the virtual Ethernet bridge) and logical ports of the UPF 214, which is part of the virtual Ethernet bridge. Herein, when discussing the bridging function within the UPF 214, this bridging function relates to the logical ports of the UPF 214. The SMF 208 parses the forwarding rules (which forward traffic between ports of the virtual Ethernet bridge, i.e., between the DS-TT ports and the NW-TT ports) to identify forwarding rule(s) that result in forwarding of traffic to logical ports of the UPF 214 that correspond to PDU session(s) in the downlink direction.

When the SMF 208 detects a forwarding rule that will result in mapping or forwarding of traffic to a logical port of the UPF 214 that corresponds to a PDU session for the downlink direction, the SMF 208 constructs, or derives, a corresponding PDR using the filtering criteria of the forwarding rule. The PDR maps downlink Ethernet packets received at the UPF 214 on an ingress Ethernet port(s) of the virtual Ethernet bridge to the PDU session that corresponds to the appropriate egress Ethernet port (e.g., a DS-TT port in the case of TSN) of the virtual Ethernet bridge for the downlink direction. In this way, the PDR maps the same traffic to the same PDU session as would be done for the original forwarding rule.

Step 504: The SMF 208 configures the PDR(s) over the N4 interface for the affected PDU Session(s).

Step 506: The UPF 214 uses the PDR(s) to map downlink Ethernet frames/packets to the appropriate PDU sessions. In this way, the bridging functionality in the UPF 214 can rely on the PDRs to map the downlink Ethernet frames into the appropriate PDU Sessions. Note that the bridging functionality may still be aware of the PDU Sessions and represent each of them with a logical port. However, the bridging functionality does not need to differentiate the frames going to the individual PDU Sessions, as those are identified by the PDRs.

In Step 504, the SMF 210 may send forwarding rules to UPF 214 (e.g., to the bridging functionality in the UPF 214) in addition to configuring the PDRs. These provided forwarding rules may include all forwarding rules or only a subset of the forwarding rules. For example, the provided forwarding rules may include forwarding rules that apply to directions other than the downlink direction. As another example, the SMF 210 may send the forwarding rules to the UPF 214 (e.g., to the bridging functionality in the UPF 214) based on which PDRs were generated and sent to the UPF 214. For instance, the SMF 210 may send the forwarding rules from which the PDRs were derived to the bridging functionality of the UPF 210 as well, which enables the bridging functionality to deliver the downlink Ethernet frames to the set of PDRs where the downlink Ethernet frames are mapped to the individual PDU Sessions.

Note that the static forwarding rules may apply only to unicast, or only to unicast and multicast forwarding. The Ethernet frames may also need to be flooded on all ports (i.e., for broadcast, multicast, and unknown unicast traffic), in which case the frames need to be replicated. It is possible to realize such flooding behavior also using the PDRs, e.g. as described in 3GPP TS 23.501 section 5.8.2.13.3.1.

Note that, in one embodiment, the UPF 214 is implemented where all PDU Sessions correspond to a single port of the logical bridge—as seen from the outside—and the PDRs map traffic to the individual PDU Sessions. In this case, externally, the PDU Sessions would appear to be connected to the bridge in the UPF 214 via a shared media (since they are not individual ports).

Figure 6:
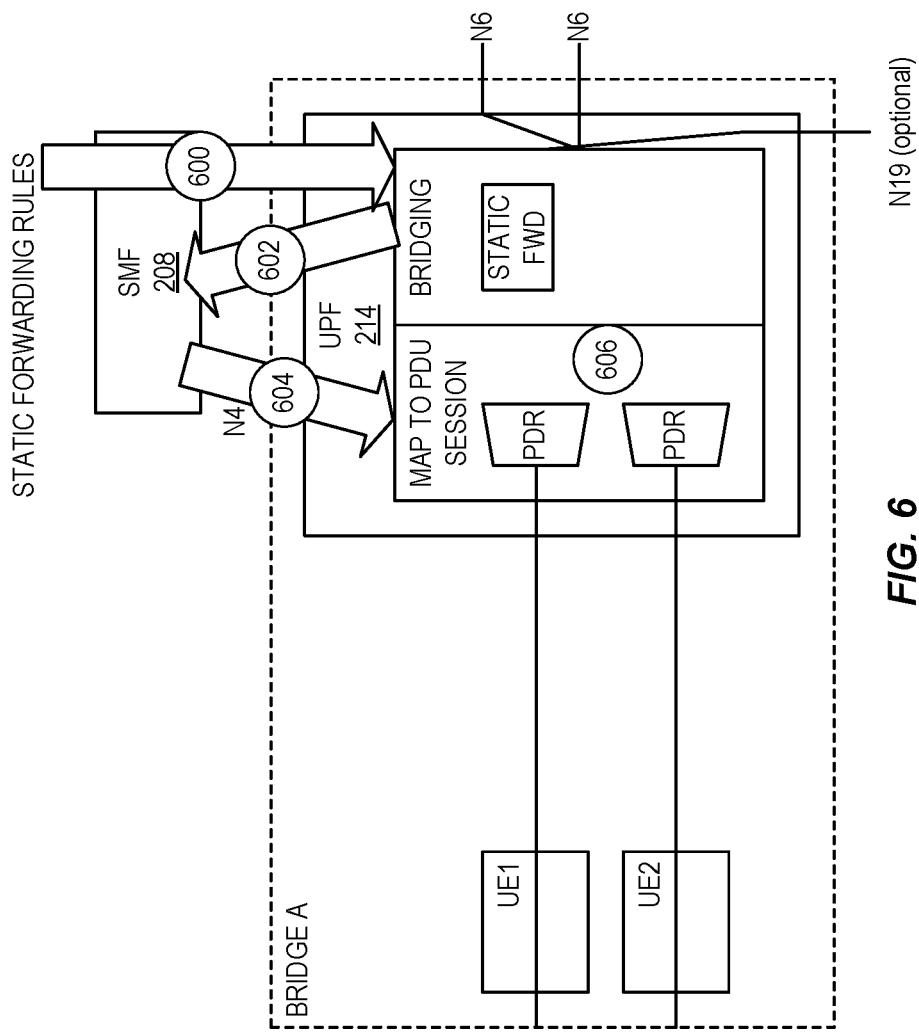

In another embodiment, the forwarding rules which need to be converted to PDRs are sent explicitly by the UPF 214 to the SMF 208, as shown in FIG. 6. The steps of this process are as follows:

Step 600: The forwarding rules in this embodiment are first delivered to the bridging functionality in the UPF 214. These forwarding rules may be provided, e.g. from the CNC via the TSN AF and PCF 210 and SMF 208 to the UPF 214. However, in this case, the SMF 208 does not need to parse these forwarding rules initially, i.e., it may go in a transparent container via the SMF 208.

Step 602: When the bridging functionality in the UPF 214 sets up a forwarding rule which is expected to forward to a PDU Session on the downlink, this is reported to the SMF 208. For this, the N4 event reporting functions can be used. In other words, the UPF 214 determines, or identifies, a forwarding rule that is expected to result in forwarding of Ethernet packets to a PDU session on the downlink direction and then reports this forwarding rule to the SMF 208.

Step 604: The SMF 208 then maps the forwarding rule to a PDR and configures the PDR to the appropriate PDU Session at the UPF 214 over the N4 interface. This approach implies additional signaling; however, the SMF 208 does not need to parse the forwarding rules itself. Instead, the SMF 208 relies on the UPF 214 to parse the forwarding rules and report when a forwarding rule applies to a PDU Session in the downlink. Based on this, the SMF 208 becomes simpler.

Step 606: The UPF 214 uses the PDR(s) to map downlink Ethernet frames to the appropriate PDU sessions.

Figure 7:
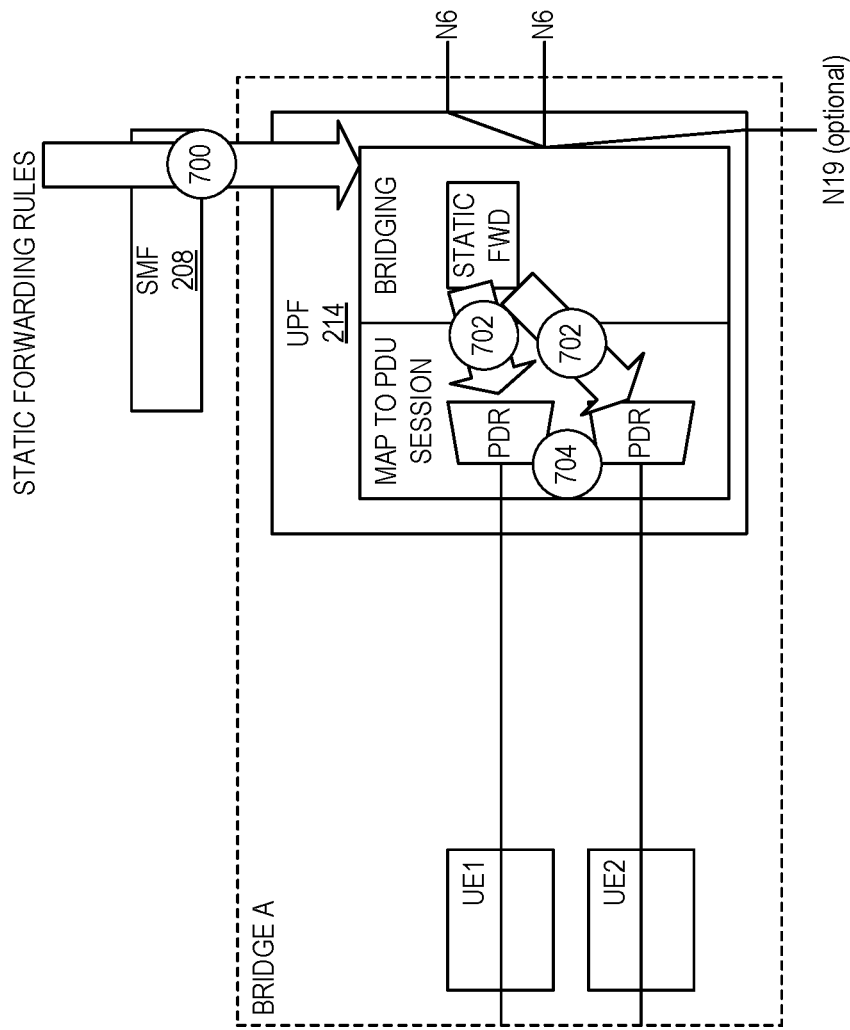

In another embodiment, the UPF 214 sets the PDR rules on its own, as illustrated in FIG. 7. The steps of this process are as follows.

Step 700: In this embodiment, the static forwarding rules are sent to the bridging function within the UPF 214.

Step 702: Then the UPF 214 internally determines which of those forwarding rules apply to PDU Sessions in the downlink. For those PDU Sessions, the UPF 214 derives the appropriate PDR filtering rules, and configures the PDRs as appropriate.

In this scenario, the SMF 208 may indicate explicitly when it sets up the PDR over the N4 interface that the filtering rule in the PDR may be locally determined. This indication can enable the UPF 214 to use the information available in its bridging functionality in the N4 to set the PDR detection rules.

Step 704: The UPF 214 uses the PDR(s) to map downlink Ethernet frames to the appropriate PDU sessions.

Figure 8:
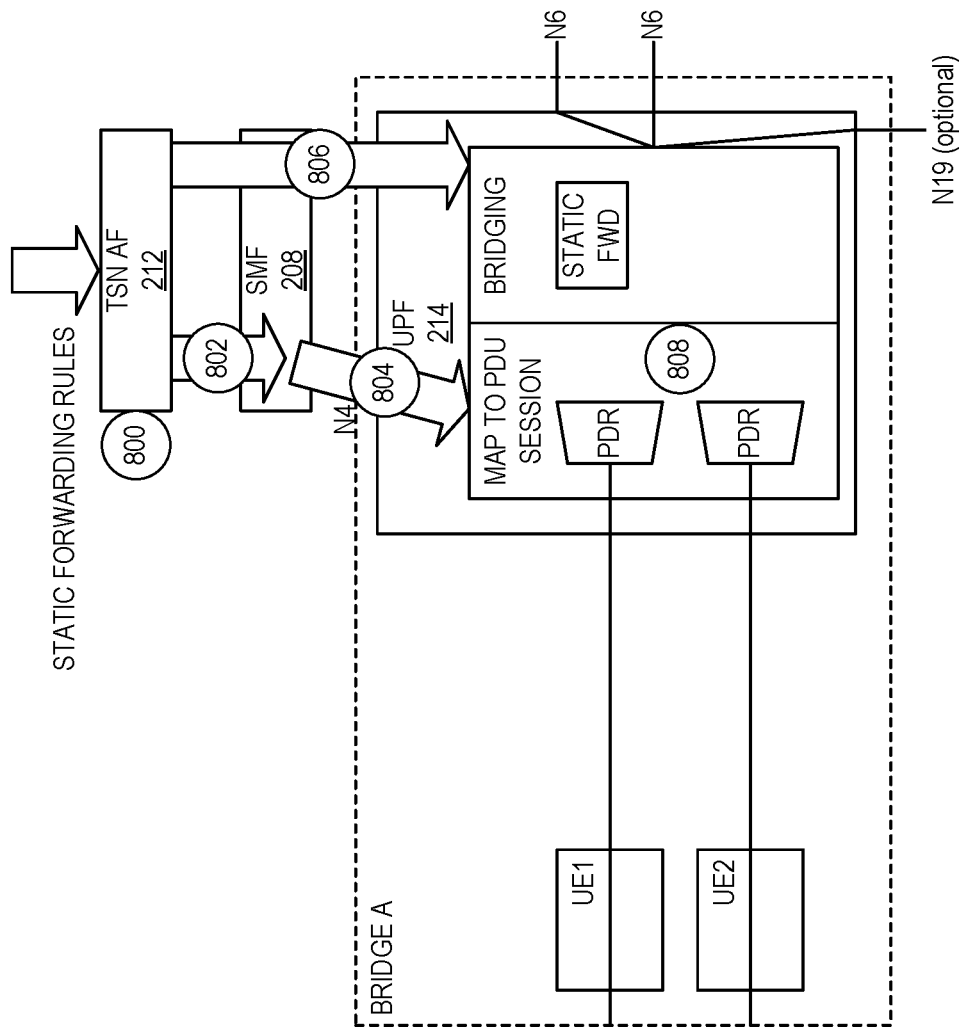

In another embodiment, the forwarding rules are parsed in another control entity, such as, e.g., the TSN AF, as illustrated in FIG. 8. The steps of the process of FIG. 8 are as follows.

Step 800: The TSN AF 212 parses the forwarding rules and determines which forwarding rules apply to ports corresponding to PDU Sessions in the downlink. More specifically, the TSN AF 212 receives the static forwarding rules, and determines which forwarding rules map downlink traffic to a PDU Session. This determination can be based on the port number, as the TSN AF 214 is aware of which port numbers correspond to DS-TT ports. The filtering rules with such outgoing port number are considered to map traffic to these PDU Sessions.

Step 802: The TSN AF 214 then provides those forwarding rules explicitly to the SMF 208.

Step 804: The SMF 208 then sets up the corresponding PDRs. More specifically, the SMF 208 receives the forwarding rules from the TSN AF 214 and configures the PDRs in the UPF 214. The Ethernet-style forwarding rules are converted to the 3GPP-format; this conversion could be performed in the TSN AF 212 or in the SMF 208, or in the UPF 214, or in an intermediate entity such as the PCF 210 in between the TSN AF 212 and the SMF 208. Note that other entities may also perform the corresponding action. E.g., there may be a PCF in between the TSN AF 212 and the SMF 208 which can also convert the Ethernet static forwarding rules to rules that are set up in the PDRs.

Step 806: Note that the original forwarding rules might also be sent to the bridging functionality in the UPF 214 so that the bridging function is also aware that the corresponding traffic is to be sent towards the PDRs. That is, it may be possible that the corresponding filtering rules are configured into the bridging function as well as the PDRs.

Step 808: The UPF 214 uses the PDR(s) to map downlink Ethernet frames to the appropriate PDU sessions.

It should be noted that while the description herein focuses on Ethernet, the embodiments described herein can be extended to Internet Protocol (IP) where the cellular communication system 100 operates as a virtual IP router. For example, in one embodiment, the UPF 214 obtains a PDR for a PDU session in a downlink direction in the cellular communications system, wherein the PDU session is associated with an egress port of a virtual IP router provided by the cellular communications system 100 for the downlink direction, the PDR maps IP packets received at the UPF 214 on an ingress port(s) of the virtual IP router provided by the cellular communications system 100 to the PDU session associated with the egress port of the virtual IP router provided by the cellular communications system 100 in accordance with an IP packet forwarding rule of the virtual IP router, and the PDR is derived from the IP packet forwarding rule. In a similar manner, other features of the systems and methods described herein can be utilized with respect to operation of the cellular communications system 100 as a virtual IP router wherein the Ethernet forwarding rules are instead IP packet forwarding rules and the ingress and egress ports are ingress and egress ports of the virtual IP router rather than ingress and egress ports of a virtual Ethernet bridge.

Figure 9:
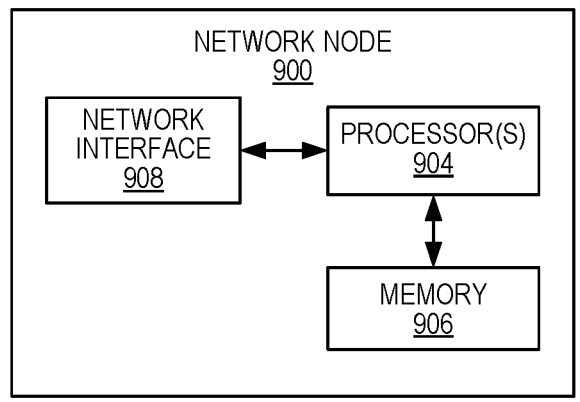
FIGS. 9, 10, and 11 are schematic block diagrams of example embodiments of a network node.

FIG. 9 is a schematic block diagram of a network node 900 according to some embodiments of the present disclosure. Optional features are represented by dashed boxes. The network node 900 may be, for example, a network node that implements a NF such as, e.g., the UPF 214, the PCF 208, or the AF 212, as described herein. As illustrated, the network node 900 includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. The one or more processors 904 operate to provide one or more functions of the network node 900 as described herein (e.g., one or more functions of the UPF 214, the PCF 208, or the AF 212, as described herein). In some embodiments, the function(s) are implemented in software that is stored, e.g., in the memory 906 and executed by the one or more processors 904.

Figure 10:
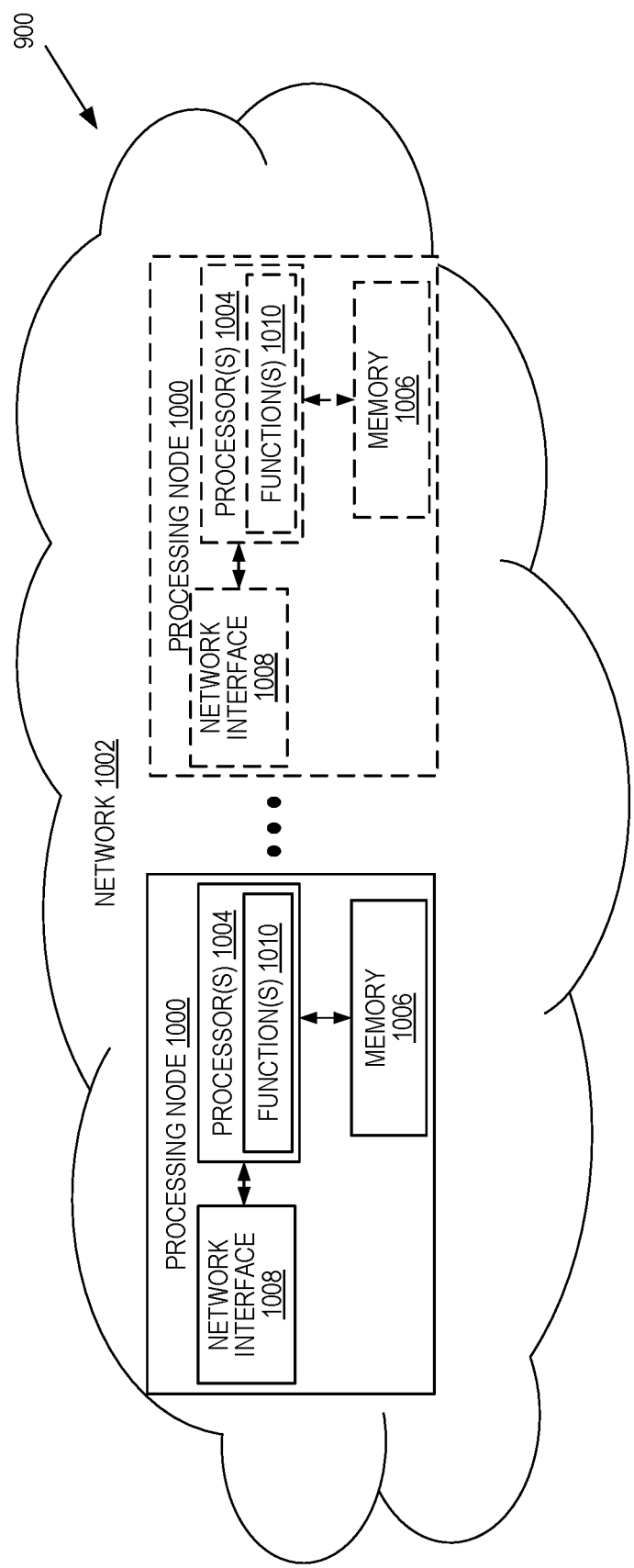

FIG. 10 is a schematic block diagram that illustrates a virtualized embodiment of the network node 900 according to some embodiments of the present disclosure. As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes one or more processing nodes 1000 coupled to or included as part of a network(s) 1002. Each processing node 1000 includes one or more processors 1004 (e.g., CPUs, ASICs, FPGAs, and/or the like), memory 1006, and a network interface 1008.

In this example, functions 1010 of the network node 900 described herein (e.g., one or more functions of the UPF 214, the PCF 208, or the AF 212, as described herein) are implemented at the one or more processing nodes 1000 or distributed across the two or more processing nodes 1000 in any desired manner. In some particular embodiments, some or all of the functions 1010 of the network node 900 described herein are implemented as virtual components executed by one or more virtual machines implemented in a virtual environment(s) hosted by the processing node(s) 1000.

In some embodiments, a computer program including instructions which, when executed by at least one processor, causes the at least one processor to carry out the functionality of the network node 900 or a node (e.g., a processing node 1000) implementing one or more of the functions 1010 of the network node 900 in a virtual environment according to any of the embodiments described herein (e.g., one or more functions of the UPF 214, the PCF 208, or the AF 212, as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
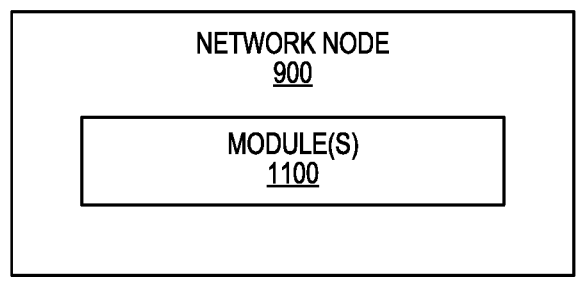

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein (e.g., one or more functions of the UPF 214, the PCF 208, or the AF 212, as described herein). This discussion is equally applicable to the processing node 1000 of FIG. 10 where the modules 1100 may be implemented at one of the processing nodes 1000 or distributed across multiple processing nodes 1000.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a User Plane Function, UPF, for a core network of a cellular communications system for enabling the cellular communications system to operate as a virtual Ethernet bridge, the method comprising:
    obtaining a Packet Detection Rule, PDR, for a Protocol Data Unit, PDU, session in a downlink direction in the cellular communications system, wherein:
        the PDU session is associated with an egress Ethernet port of a virtual Ethernet bridge provided by the cellular communications system for the downlink direction;
        the PDR maps Ethernet packets received at the UPF on an ingress Ethernet port(s) of the virtual Ethernet bridge provided by the cellular communications system to the PDU session associated with the egress Ethernet port of the virtual Ethernet bridge provided by the cellular communications system in accordance with an Ethernet packet forwarding rule of the virtual Ethernet bridge; and
        the PDR is derived from the Ethernet packet forwarding rule.

2. The method of claim 1 further comprising applying the PDR at the UPF.

3. The method of claim 1 wherein obtaining the PDR comprises receiving the PDR from another network entity.

4. The method of claim 3 wherein the another network entity is a Session Management Function, SMF.

5. The method of claim 3 further comprising receiving the Ethernet packet forwarding rule and configuring the Ethernet packet forwarding rule at the UPF.

6. The method of claim 1 wherein obtaining the PDR comprises:
    receiving one or more Ethernet packet forwarding rules, the one or more Ethernet packet forwarding rules comprising the Ethernet packet forwarding rule;
    determining that the Ethernet packet forwarding rule is a rule for which Ethernet packets will be forwarded to a PDU session in the downlink direction;
    reporting the Ethernet packet forwarding rule to another network entity; and
    responsive to reporting the Ethernet packet forwarding rule to the another network entity, receiving the PDR from the another network entity.

7. The method of claim 6 wherein the another network entity is a Session Management Function, SMF.

8. The method of claim 1 wherein obtaining the PDR comprises:
    receiving one or more Ethernet packet forwarding rules, the one or more Ethernet packet forwarding rules comprising the Ethernet packet forwarding rule;
    determining that the Ethernet packet forwarding rule is a rule for which Ethernet packets will be forwarded to a PDU session in the downlink direction;
    deriving the PDR based on the Ethernet packet forwarding rule; and
    configuring the PDR at the UPF.

9. The method of claim 1, wherein the Ethernet packet forwarding rule originates from a central controller.

10. A method performed by network function, NF, for a core network of a cellular communications system for enabling the cellular communications system to operate as a virtual Ethernet bridge, the method comprising:
    receiving one or more Ethernet packet forwarding rules for a virtual Ethernet bridge provided by the cellular communications system;
    identifying an Ethernet packet forwarding rule from among the one or more Ethernet packet forwarding rules that will result in forwarding of Ethernet packets received at a User Plane Function, UPF, of the cellular communications system on an ingress Ethernet port of the virtual Ethernet bridge to a Protocol Data Unit, PDU, session of the cellular communications system for a downlink direction, the PDU session being associated with an egress Ethernet port of the virtual Ethernet bridge provided by the cellular communications system;
    deriving a Packet Detection Rule, PDR, for the PDU session from the Ethernet packet forwarding rule, wherein the PDR maps Ethernet packets received at a User Plane Function, UPF, of the cellular communications system on the ingress Ethernet port of the virtual Ethernet bridge to the PDU session associated with the egress Ethernet port in accordance with the Ethernet packet forwarding rule; and
    providing the PDR to the UPF.

11. The method of claim 10 wherein the NF is a Session Management Function, SMF.

12. A method performed by network function, NF, for a core network of a cellular communications system for enabling the cellular communications system to operate as a virtual Ethernet bridge, the method comprising:
    receiving one or more Ethernet packet forwarding rules for a virtual Ethernet bridge provided by the cellular communications system;
    providing the one or more Ethernet packet forwarding rules to a User Plane Function, UPF;
    receiving, from the UPF, a notification of an Ethernet packet forwarding rule from among the one or more Ethernet packet forwarding rules that will result in forwarding of Ethernet packets received at the UPF on an ingress Ethernet port of the virtual Ethernet bridge provided by the cellular communications system to a Protocol Data Unit, PDU, session of the cellular communications system for a downlink direction, the PDU session being associated with an egress Ethernet port of the virtual Ethernet bridge provided by the cellular communications system;
    deriving a Packet Detection Rule, PDR, for the PDU session from the Ethernet packet forwarding rule, wherein the PDR maps Ethernet packets received at a User Plane Function, UPF, of the cellular communications system on the ingress Ethernet port of the virtual Ethernet bridge to the PDU session associated with the egress Ethernet port in accordance with the Ethernet packet forwarding rule; and
    providing the PDR to the UPF.

13. The method of claim 12 wherein the NF is a Session Management Function, SMF.

14. A method performed by network function, NF, for a core network of a cellular communications system for enabling the cellular communications system to operate as a virtual Ethernet bridge, the method comprising:
- receiving, from another network entity, a notification of an Ethernet packet forwarding rule that will result in forwarding of Ethernet packets received at the UPF on an ingress Ethernet port of the virtual Ethernet bridge provided by the cellular communications system to a Protocol Data Unit, PDU, session of the cellular communications system for a downlink direction, the PDU session being associated with an egress Ethernet port of the virtual Ethernet bridge provided by the cellular communications system;
- deriving a Packet Detection Rule, PDR, for the PDU session from the Ethernet packet forwarding rule, wherein the PDR maps Ethernet packets received at a User Plane Function, UPF, of the cellular communications system on the ingress Ethernet port of the virtual Ethernet bridge to the PDU session associated with the egress Ethernet port in accordance with the Ethernet packet forwarding rule; and
- providing the PDR to the UPF.

15. The method of claim 14 wherein the NF is a Session Management Function, SMF.

16. A method performed by a User Plane Function, UPF, for a core network of a cellular communications system for enabling the cellular communications system to operate as a virtual Internet Protocol, IP, router, the method comprising:
- obtaining a Packet Detection Rule, PDR, for a Protocol Data Unit, PDU, session in a downlink direction in the cellular communications system, wherein:
  - the PDU session is associated with an egress port of a virtual IP router provided by the cellular communications system for the downlink direction;
  - the PDR maps IP packets received at the UPF on an ingress port(s) of the virtual IP router provided by the cellular communications system to the PDU session associated with the egress port of the virtual IP router provided by the cellular communications system in accordance with an IP packet forwarding rule of the virtual IP router; and
  - the PDR is derived from the IP packet forwarding rule.

* * * * *